(12) United States Patent
Murschall et al.

(10) Patent No.: US 6,852,388 B2
(45) Date of Patent: Feb. 8, 2005

(54) BIAXIALLY ORIENTED FILM WITH BETTER SURFACE QUALITY BASED ON CRYSTALLIZABLE POLYESTERS AND PROCESS FOR PRODUCING THE FILM

(75) Inventors: Ursula Murschall, Nierstein (DE); Ulrich Kern, Ingelheim (DE); Rainer Kurz, Bad Schwalbach (DE); Holger Kliesch, Mainz (DE); Bodo Kuhmann, Runkel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/242,044

(22) Filed: Sep. 12, 2002

(65) Prior Publication Data

US 2003/0171529 A1 Sep. 11, 2003

(30) Foreign Application Priority Data

Mar. 11, 2002 (DE) .......................................... 102 10 502

(51) Int. Cl.7 ................................................. B32B 3/10
(52) U.S. Cl. ....................... 428/141; 528/272; 528/287; 528/293; 528/298; 528/302; 528/308.6; 524/81; 524/115; 524/186; 524/323; 264/176.1; 264/210; 264/211.12; 264/212
(58) Field of Search .................................. 528/272, 287, 528/293, 298, 302, 307, 308, 308.6; 524/81, 115, 186, 323; 264/176.1, 210, 211.12, 212; 428/141

(56) References Cited

U.S. PATENT DOCUMENTS

| | | | |
|---|---|---|---|
| 4,011,196 A | | 3/1977 | Carevic et al. |
| 5,556,739 A | * | 9/1996 | Nakanishi et al. ........... 430/533 |
| 5,562,984 A | * | 10/1996 | Mortlock et al. ............ 428/364 |
| 6,485,810 B1 | * | 11/2002 | Uchida et al. .............. 428/141 |
| 2002/0065346 A1 | * | 5/2002 | Murschall et al. .......... 524/323 |

FOREIGN PATENT DOCUMENTS

| | | |
|---|---|---|
| EP | 0 620 245 A1 | 10/1994 |
| EP | 0 620 245 B1 | 5/1998 |
| KR | 2001-0047779 | 2/2002 |

* cited by examiner

*Primary Examiner*—Samuel A. Acquah
(74) *Attorney, Agent, or Firm*—ProPat, L.L.C.

(57) ABSTRACT

The invention relates to a single- or multilayer, biaxially oriented film based on a crystallizable polyester and comprising at least one primary stabilizer for inhibiting oxidative degradation. The crystallizable polyester comprises from 100 to 10 000 ppm of primary stabilizer in covalently bonded form. The invention further relates to a process for producing the film.

23 Claims, No Drawings

BIAXIALLY ORIENTED FILM WITH BETTER SURFACE QUALITY BASED ON CRYSTALLIZABLE POLYESTERS AND PROCESS FOR PRODUCING THE FILM

BACKGROUND OF THE INVENTION

The invention relates to a single- or multilayer, biaxially oriented film based on crystallizable polyesters and comprising at least one primary stabilizer for inhibiting oxidative degradation. It also relates to a process for producing the film.

Films based on crystallizable polyesters, in particular based on crystallizable polyethylene terephthalates, are known. Polypropylene films which comprise additives for preventing oxidative degradation have also been described.

However, the surface quality of these known polyester films is inadequate for some applications. For example, substrate films for magnetic tapes have to have particularly uniform structure. Non-uniformity in the film structure is also very disadvantageous for capacitor films, thermal transfer films, packaging films, and films for industrial applications. The surface defects are generally brought about by gel particles and also impair appearance and further processing, for example metalizing or printing.

Polyester films are generally produced from polymer pellets melted in an extruder. The resultant polymer melt is molded by way of a slot die to give what is known as a prefilm. The prefilm is then applied to a take-off roll and chill roll, and then oriented longitudinally and transversely, and finally rolled up. These rolls of film should have no longitudinal corrugations, creases, run-outs, or other defects which impair appearance or further processing. Longitudinal corrugations in the film can generally be attributed to defective transverse profile. The transverse profile is also adversely affected by deposits on the extrusion die. Die deposits are in turn mostly produced from constituents of the polymer melt.

It was therefore an object to reduce the number of surface defects in the polyester film. In particular, the film should have fewer specks and gel-particle-based defects. In addition, the film should have no longitudinal corrugations or other defects which impair roll structure. Furthermore, process stability should be raised, i.e. no film break-offs or similar disruptions should occur. Screen service life should be prolonged, and drying times shortened, and it should be possible to use film regrind, even in relatively large proportions. Throughput and production rate should moreover be optimized.

The object is achieved if the stabilizer is added, and thus incorporated into the polyester, prior to the polycondensation process.

BRIEF DESCRIPTION OF THE INVENTION

The present invention therefore provides a single- or multilayer, biaxially oriented film based on a crystallizable polyester and comprising at least one primary stabilizer for inhibiting oxidative degradation, wherein the crystallizable polyester comprises from 100 to 10 000 ppm of primary stabilizer in covalently bonded form. The proportion of the covalently bonded stabilizer is preferably from 150 to 9 000 ppm, particularly preferably from 200 to 8 000 ppm.

DETAILED DESCRIPTION OF THE INVENTION

The primary stabilizer is preferably a constituent of the main polymer chain of the polyester. It therefore contains at least two groups capable of polycondensation during polyester formation, preferably carboxy groups and/or ester groups, particularly preferably ester groups. Particularly preferred primary stabilizers are phenolic compounds, in particular sterically hindered phenols, which have additional ester groups and/or carboxy groups capable of participating in the polycondensation reaction.

Sterically hindered phenols of this type are obtainable with the name Irganox from Ciba Specialty Chemicals. Other suitable compounds are thiobisphenols, alkylidenebisphenols, alkylphenols, hydroxybenzyl compounds, acylaminophenols, and hydroxyphenylpropionates. Other suitable compounds are aromatic compounds having 2 or more secondary amino groups. The primary stabilizers are described by way of example in the monograph by Gächter and Müller "Kunststoffadditive" [Plastics additives], $2^{nd}$ edition, Carl Hanser Verlag, and in the monograph by Dr. Hans Zweifel, "Plastics Additives Handbook", $5^{th}$ edition, Carl Hanser Verlag.

Primary stabilizers of the abovementioned type have been known for a long time, inter alia as additives for polyesters. However, they have always been admixed after the polycondensation process and have therefore not been an integral constituent of the polyester, i.e. they have not been covalently bonded within the polyester.

These primary stabilizers are, where appropriate, used in combination with secondary stabilizers which support or else strengthen the action of the primary stabilizer. Particularly suitable secondary stabilizers are thioethers, and also zinc dibutyldithiocarbamate. The second stabilizer is generally an additive, i.e. not an integral constituent of the polyester. Its proportion is generally from 0.01 to 1.0% by weight, preferably from 0.05 to 0.5% by weight, based in each case on the weight of the film.

The polyester having the covalently incorporated primary stabilizer (hereinafter termed "modified polyester") generally has an SV in the range from 450 to 1 100, preferably from 700 to 900.

If the polyester is prepared by the dimethyl terephthalate (DMT) process, it is advantageous for the primary stabilizer to be added prior to or after the transesterification process and directly prior to the polycondensation process, in the form of a solution or dispersion in glycol. The melt resistivity of the resultant modified polyester is in the range from $1 \cdot 10^7$ to $120 \cdot 10^7$ ohm·cm, and is therefore not significantly different from that of an unmodified polyester. Where appropriate, the melt resistivity may be adjusted to the desired value by adding ionic additives.

Besides units composed of ethylene glycol and terephthalic acid, the modified, crystallizable polyester also, where appropriate, contains units composed of isophthalic acid, naphthalene-2,6-dicarboxylic acid, and/or biphenyldicarboxylic acid (=bibenzoic acid), and/or units composed of aliphatic or cycloaliphatic diols having from 2 to 8 carbon atoms, in particular composed of propylene glycol, butylene glycol, and/or cyclohexanedimethanol. The materials are therefore preferably modified polyethylene terephthalate, polybutylene terephthalate, poly(1,4-cyclohexanedimethylene terephthalate), polyethylene naphthalene-2,6-dicarboxylate, polyethylene naphthalene-1,5-dicarboxylate, polyethylene naphthalate bibenzoate, or poly(ethylene p-hydroxybenzoate). Modified polyethylene terephthalate (PET) and modified polyethylene naphthalate (PEN) and mixtures of these are preferred.

The term modified, crystallizable polyethylene terephthalates or polyethylene naphthalates here is intended to mean crystallizable homopolymers, crystallizable compounded materials, crystallizable copolymers, crystallizable recycled materials, and other variations.

The polyesters may be prepared from dimethyl terephthalate by the transesterification process (DMT process), suitable transesterification catalysts being salts of zinc, of magnesium, of calcium, of manganese, of lithium, or of germanium. They may also be prepared by direct esterification (PTA process). Various polycondensation catalysts may be used here, in particular antimony compounds, germanium compounds, or titanium compounds. Phosphorus compounds are used as stabilizers.

The covalently bonded primary stabilizer reduces thermal degradation of the polymer during the polycondensation reaction. This applies both to the DMT process and the PTA process, and is of particular importance when preparing polyesters which, for example, have pigments or particles (in particular silicon dioxide) as fillers. The pigments or particles here are added in the same way prior to the polycondensation reaction.

Up to 50 mol %, preferably up to 30 mol %, of the polymer units in the polyester may have been replaced by comonomer units. The dicarboxylic acid component or the glycol component, or both, may have been replaced to some extent here. Examples of acid components which may be present in the polyester are adipic acid, glutaric acid, succinic acid, sebacic acid, the sodium salt of 5-sulfoisophthalic acid. Polyfunctional acids, such as trimellitic acid, may also be present.

The thickness of the biaxially oriented film of the invention is generally from 0.5 to 500 µm, preferably from 1 to 350 µm, particularly preferably from 2 to 190 µm.

Surprisingly, when the modified polyesters are used according to the present invention practically no die deposits arise, with the result that profile and roll formation for the film produced with these are markedly better than for films made from standard polymers (i.e. polyesters without stabilizers incorporated during the polycondensation process). Even after two days of production, no deposits of any kind could be observed. The profile of the film can therefore be held precisely constant over a very long period, giving very good roll formation. When comparison is made with a film made from unmodified polyester, the number of gel bodies and specks is drastically smaller, resulting in an enormous improvement in surface quality. Film break-offs are practically eliminated, even at relatively high speeds. During two days of production of a very thin film of thickness 4.5 µm, produced at a high production speed (more than 280 m/min), there was not a single break-off.

It was also surprising that the polymer screen had a longer service life.

Depending on the type of film, the service lives were markedly prolonged, and in some cases doubled. The result is a marked improvement in the cost-effectiveness of film production. It was also surprising that the regrind arising directly during film production could be reused without difficulty, even in large amounts (up to 60% by weight) without any adverse effect on the properties of the film.

In particular, it was surprising that drying times for the thermoplastic or the mixture of thermoplastic and regrind were reduced by up to 30% when compared with those for standard polymers.

The polyester film of the invention may also have a multilayer structure. It is then generally composed of at least one core layer or base layer and of at least one outer layer. Preference is given to three-layer films with A-B-A or A-B-C structure (B=core layer, A and C=outer layers). The core layer is preferably composed of the stabilizer-modified polyethylene terephthalate homopolymers (the term modified PET homopolymers here being used for those which do not contain any units of other monomers besides the ethylene glycol units, the terephthalate units, and the stabilizer units). The outer layers may be composed of modified or unmodified PET homopolymers or of modified or unmodified PEN homopolymers, or of modified or unmodified poly(ethylene terephthalate-ethylene naphthalate), or of corresponding compounded materials.

The core layer or base layer and/or outer layer(s) may also comprise other conventional additives, such as antiblocking agents, soluble dyes, white pigments, and/or color pigments. The additives are advantageously added to the polymer or to the polymer mixture before melting begins.

Other additives which may be selected are mixtures of two or more different antiblocking agents or mixtures of antiblocking agents of the same composition but of different particle size. The particles may be added in the usual concentrations to each of the layers, e.g. in the form of a glycolic dispersion, either directly during polycondensation or subsequently, directly prior to the extrusion process, in the form of one or more masterbatches. Additive concentrations in the range from 0.0001 to 20.0% by weight, based on the weight of the layer(s) provided therewith, have proven particularly suitable.

The structure of the multilayer films may therefore be symmetrical or asymmetrical. The core layers and/or outer layers may have been provided with additional additives or be composed of different types of polyester (e.g. with different molecular weight or different viscosity). Coextrusion is a particularly simple method of producing the multilayer films.

One method of producing the film uses a fully prepared polymer to which all of the additives have been added prior to the polycondensation process. Another method introduces all or some of the additives during film production, preferably with the aid of masterbatch technology. For this, various raw material components, each of which comprises various additives, are mixed prior to the extrusion process. The modified polyester may be the clear polymer here, or at least be a substantial constituent of the clear polymer, to which the masterbatches with the various additives are then added. The modified polyester may also be introduced solely or additionally by way of the masterbatches.

The raw material components, and also any masterbatches used, should have been precrystallized or predried. The predrying advantageously includes gradual heating at subatmospheric pressure (from 20 to 80 mbar, preferably from 30 to 60 mbar, in particular from 40 to 50 mbar), with stirring, and, where appropriate, after-drying at a constant elevated temperature (again at subatmospheric pressure). It is advantageous for the raw material components to be charged together with the polymers for the base layers and/or outer layers and, where appropriate, other components at room temperature, preferably in batches, to a vacuum dryer. During the course of the drying or residence time, the material passes through a temperature profile from 10 to 160° C., preferably from 20 to 150° C., in particular from 30 to 130° C. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is after-dried in a downstream container, likewise evacuated, at from 90 to 180° C., preferably from 100 to 170° C., in particular from 110 to 160° C., for from 2 to 8 hours, preferably from 3 to 7 hours, in particular from 4 to 6 hours.

In the preferred extrusion process for producing the film, the molten polyester material is extruded through a slot die and quenched on a chill roll in the form of a substantially amorphous prefilm. This film is then reheated and oriented longitudinally and transversely, or transversely and longitudinally, or longitudinally, transversely, and again longitudinally and/or transversely. The stretching temperatures are generally above the glass transition temperature $T_g$ of the film by from 10 to 60° and the stretching ratio for longitudinal stretching is usually from 2 to 6, in particular from 3 to 4.5, and that for the transverse stretching is from 2 to 5, in particular from 3 to 4.5, and that for any second longitudinal and transverse stretching carried out is from 1.1 to 3. The first longitudinal stretching may also be carried out simultaneously with the transverse stretching (simultaneous stretching). Heat-setting of the film follows at oven temperatures of from 150 to 250° C., in particular from 170 to 240° C. The film is then cooled and wound up.

Its combination of excellent properties makes the film of the invention suitable for a wide variety of different applications, of which just a few are named here: particularly in industry, in electronics, for thermal transfer, or as a packaging material, as a magnetic tape film, stamping foil, release film, or lid film, as a capacitor film, as an insulating material, or for lamination. The film may be used with particular advantage wherever particularly uniform and high quality is an important requirement.

The following standards and methods are used in testing each of the properties in the examples below.

Average Thickness

Length, width, and density of a film being known, average thickness $d_F$ is determined from the weight of the film. The weight measured is that of a film strip prepared on the trimming table, taken from the center of a specimen which traverses the entire width of the roll. The calculation of $d_F$ uses the formula $$d_f = \frac{m[g]}{l[mm] \cdot b[mm] \cdot d[g/cm^3]} \cdot 10^{-6}$$

where:

m=weight of tested film section
l=specimen length
b=specimen width
d=density of tested material (for polyester, 1.395 g/cm³)

After cutting to size, each of the film strips is weighed on a Mettler PM 200 analytical balance (maximum weight 200 g), attached to which there is a HP Vectra ES/12 computer which, after machine and roll number have been input, takes all of the parameters from the OPUS program and thus calculates the average thickness.

Standard Viscosity (SV) and Intrinsic Viscosity (IV):

Standard viscosity (SV) was measured—by a method based on DIN 53726—using a 1% strength solution in dichloroacetic acid (DCA) at 25° C. SV (DCA)=$(\eta_{rel}-1) \times 1000$. Intrinsic viscosity (IV) is calculated as follows from standard viscosity (SV)

$$IV=[\eta]=6.907 \cdot 10^{-4} \, SV(DCA)+0.063096 \, [dl/g]$$

Surface Defects

Surface defects (gel bodies and specks) are determined visually.

Roll Formation

Roll formation is assessed visually using the criteria of longitudinal cracks, creases, and run-outs.

Break-Offs

The number of film break-offs per unit of time is compared with those for conventional polymer, and the percentage variance is determined.

Die Deposits

Die deposits are determined visually.

Film Profile

The profile of the film is determined by a capacitive method with the aid of the ML 210-12-1 electronic thickness-measurement device from Eichhorn-Hausmann. For this, a strip of width 70 mm is cut out transversely across the entire width of the film and wound up on an aluminum roller. The film is unwound from the roll using roll-unwinding unwinding equipment, and during this process is passed between 2 capacitor plates. The dielectric constant set is 3.30.

The electrical potential differences brought about by the differences in thickness of the films are converted into a thickness profile with the aid of suitable software.

The value DE gives the difference between maximum and minimum thickness across the entire width of the film.

Screen Service Life

Screen change can be required firstly as a result of reaching the pressure limit and secondly through formation of specks or gel bodies. After a certain number of days, screen service life is compared with that for conventional polymer, and the percentage variance is determined.

The examples below provide further illustration of the invention but do not in any way restrict the same. Percentages in the examples are percentages by weight unless otherwise stated or otherwise clear from the context.

EXAMPLE 1

Polyethylene terephthalate (KoSa, Germany) which contained 1 000 ppm of ®Irganox 1010 (Ciba Specialties, Switzerland) as integral constituent of the polymer chain (polymer 1) with SV 810 was dried at 160° C. to residual moisture 50 ppm and fed to an extruder. The film also comprised 30% of regrind of the same type of material. Stepwise orientation longitudinally and transversely was then used to produce a single-layer glass-clear film of thickness 50 µm. The film was produced for 7 days at a speed of 110 m/min.

EXAMPLE 2

A film of thickness 4.5 µm was produced with the following composition:

60% of polymer from Example 1,
10% of masterbatch which comprised 5 000 ppm of ®Irganox 1010 incorporated into the polymer chain by condensation and 20 000 ppm of ®Sylobloc 44H (Grace, Germany) as additive, and
30% of the regrind arising directly during the production process.

The production speed was 280 m/min, and the production time was 14 days.

EXAMPLE 3

A film of thickness 12 µm was produced from a polymer which comprised, alongside polyethylene terephthalate, 1 000 ppm of ®Irganox 1010 incorporated into the polymer chain by condensation and 1 500 ppm of ®Syloblock 44H as additive. The proportion of regrind of the same type of material was 40%. The production speed was 340 m/min, and the production time was 12 days.

COMPARATIVE EXAMPLE c1

Example 2 was repeated. However, the polymers used contained no ®Irganox 1010.

COMPARATIVE EXAMPLE c2

Example 2 was repeated. However, ®Irganox 1010 was not incorporated into the polymer chain by condensation, but added after the polycondensation process, and functioned merely as additive.

The table below shows the property profile for the films produced in the examples and comparative examples:

|  |  | Examples | | | | |
|---|---|---|---|---|---|---|
| Properties |  | 1 | 2 | 3 | c1 | c2 |
| Average thickness | μm | 50 | 4.5 | 12 | 4.5 | 4.5 |
| Profile DE | μm | 0.5 | 0.4 | 0.4 | 0.7 | 0.6 |
| Surface defects)[1] |  | 6 | 12 | 8 | 30 | 25 |
| Roll formation |  | good | good | good | longitudinal corrugations, creases | longitudinal corrugations, creases |
| Break-off)[2] | % | 30 | 60 | 45 | 0 | 10 |
| Screen service life)[2] | % | 40 | 100 | 80 | 0 | 10 |
| Die deposits |  | none observed | none observed | none observed | clearly visible | clearly visible |

)[1] = number of defects per 5 m$^2$
)[2] = improvement in % compared with "standard"

What is claimed is:

1. A single- or multilayer, biaxially oriented film based on a crystallizable polyester and comprising at least one primary stabilizer for inhibiting oxidative degradation, wherein the crystallizable polyester comprises from about 100 to about 10 000 ppm of primary stabilizer, said primary stabilizer supplied as a predried or precrystull masterbatch composition comprising said primary stabilizer covalently bonded to masterbatch polymer.

2. The film as claimed in claim 1, wherein the proportion of the covalently bonded stabilizer is from about 150 to about 9000 ppm.

3. The film as claimed in claim 1, wherein the primary stabilizer is a constituent of the main polymer chain of the polyester.

4. The film as claimed in claim 3, wherein the primary stabilizer has at least two groups capable of polycondensation during polyester formation.

5. The film as claimed in claim 4, wherein the two groups are selected from one or more of carboxy groups and ester groups.

6. The film as claimed in claim 4, wherein the two groups are ester groups.

7. The film as claimed in claim 1, wherein the primary stabilizer is a sterically hindered phenol, a thiobisphenol, alkylidenebisphenol or alkylphenol, a hydroxybenzyl compound, an acylaminophenol, a hydroxyphenylpropionate, or an aromatic compound having 2 or more secondary amino groups.

8. The film as claimed in claim 1, which also comprises a secondary stabilizer.

9. A single- or multilayer, biaxially oriented film based on a crystallizable polyester and comprising at least one primary stabilizer for inhibiting oxidative degradation, wherein the crystallizable polyester comprises from about 100 to about 10 000 ppm of primary stabilizer, said primary stabilizer supplied as a predried or precrystallized masterbatch composition comprising said primary stabilizer coyalently bonded to masterbatch polymer, said film further comprising a secondary stabilizer, wherein the secondary stabilizer is a thioether or zinc dibutyldithiocarbamate.

10. A single- or multilayer, biaxially oriented film based on a crystallizable polyester and comprising at least one primary stabilizer for inhibiting oxidative degradation, wherein the crystallizable polyester comprises from about 100 to about 10 000 ppm of primary stabilizer, said primary stabilizer supplied as a predried or precrystallized masterbatch composition comprising said primary stabilizer coyalently bonded to masterbatch polymer, said film further comprising a secondary stabilizer, wherein the proportion of the secondary stabilizer is from about 0.01 to about 1.0% by weight, based on the weight of the film.

11. The film as claimed in claim 1, wherein the SV of the polyester having the covalently bonded primary stabilizer is from about 450 to about 1100.

12. The film as claimed in claim 1, wherein the melt resistivity of the polyester having the covalantly bonded primary stabilizer is in the range from about $1 \cdot 10^7$ to about $120 \cdot 10^7$ ohm·cm.

13. The film as claimed in claim 1, wherein the polyester having the covalently bonded primary stabilizer is a modified polyethylene terephthalate, polybutylene terephthalate, poly(1,4-cyclohexanedimethylene terephthalate), polyethylene naphthalene-2,6-dicarboxylate, polyethylene naphthalene-1,5-dicarboxylate, polyethylene naphthalate/bibenzoate, or poly(ethylene p-hydroxybenzoate).

14. The film as claimed in claim 1, wherein the film has a thickness from about 0.5 to about 500 μm.

15. The film as claimed In claim 1, wherein the film has three layers and has an A-B-A structure or A-B-C structure B=core layer, A and C=outer layers).

16. The film as claimed in claim 1, wherein one or more of core layer, base layer and outer layer comprise other conventional additives.

17. The film as claimed in claim 1, wherein the film has been heat-set.

18. A process for producing a film as claimed in claim 1, which comprises extruding molten polyester materials through a slot die and quenching the same in the form of a substantially amorphous prefilm on a chill roll, and then reheating the prefilm and orienting it longitudinally and transversely, or transversely and longitudinally, or longitudinally ,trunaversely, and again longitudinally and/or transversely, and, where appropriate, heat-setting the same.

19. A method of making a thermal transfer ribbon, or a packaging material or a magnetic tape film, or a stamping foil or a release film or a lid film, or a capacitor film or a insulating material which method comprises transforming a film as claimed in claim 1 into a thermal transfer ribbon, or a packaging material, or a magnetic tape film, or a stamping foil, or a release film, or a lid film, or a capacitor film, or an insulating material.

20. A single- or multilayer, biaxially oriented based on a cystalilzable polyester and further comprising at least one primary stabilizer and at least one secondary stabilizer, said primary stabilizer covalently bonded to said crystallizable polyester and said secondary stabilizer present as an additive that is not covalently bonded to said crystallizable polyester.

21. A film according to claim 20, wherein the primary stabilizer is a sterically hindered phenol, a thiobisphenol, alkylidenebisphenol or alkylphenol, a hydroxybenzyl compound, an acylaminophenol, a hydroxyphenylpropionate, or an aromatic compound having 2 or more secondary amino groups, and said secondary stabilizer is a thioether or zinc dibutyldithiocarbamate.

22. A multilayer polyester film comprising a core layer disposed between two outer layers, said core layer comprising crystallizable polyester and at least one primary stabilizer covalently bonded to said crystallizable polyester, said stabilizer present within said core layer alone.

23. A single- or multilayer, biaxially oriented film comprising a crystallizable polyester and at least one primary stabilizer, said primary stabilizer covalently bonded to said crystallizable polyester, wherein said biaxially oriented film further comprises from 30 to 60 weight % of recycle formed from said film.

* * * * *